United States Patent [19]
Kun

[11] Patent Number: 5,899,146
[45] Date of Patent: May 4, 1999

[54] CARTOON DRAWER WITH BUILT-IN LAMP

[76] Inventor: Lee Chin Kun, 1st. Fl., No. 10, Lane 45, Jiu-Lu-Tu Street, San-Chorng City, Taipei Country, Taiwan

[21] Appl. No.: 09/012,564

[22] Filed: Jan. 23, 1998

[51] Int. Cl.$^6$ ...................................................... A47B 85/00
[52] U.S. Cl. .............................................................. 108/23
[58] Field of Search ................................ 108/23; 362/97, 362/127, 133

[56] References Cited

U.S. PATENT DOCUMENTS

| | | | |
|---|---|---|---|
| 1,887,288 | 11/1932 | Clausen | 108/23 |
| 2,215,462 | 9/1940 | Davidson, Jr. et al. | 108/23 X |
| 2,218,395 | 10/1940 | Hallbauer | 108/23 |
| 2,643,326 | 6/1953 | Knapp | 108/23 X |
| 2,652,657 | 9/1953 | Joy | 108/23 X |
| 3,032,917 | 5/1962 | Shine | 108/23 |
| 3,456,352 | 7/1969 | Bowen | 108/23 X |

FOREIGN PATENT DOCUMENTS

| | | | |
|---|---|---|---|
| 1003135 | 3/1952 | France | 108/23 |
| 874830 | 1/1954 | Germany | 108/23 |

*Primary Examiner*—Jose V. Chen
*Attorney, Agent, or Firm*—Bacon & Thomas, PLLC

[57] ABSTRACT

A cartoon drawer with built-in lamp comprises a disk, a tank formed on the central portion of the disk, a ground glass plate placed upon the tank and covering the tank to allow the light of lamp within the tank to transmit therethrough, a pair of positioning rulers placed on the top/bottom sided of tank respectively, and a pair of fixing plates placed on the outer sides of the rulers to guide the lateral sliding of the ruler. By using this arrangement, the cartoon drawer has a built-in lamp and the user only needs to place the cartoon drawer with the built-in lamp within the aperture of the cartoon-drawing table.

3 Claims, 6 Drawing Sheets

CARTOON DRAWER WITH BUILT-IN LAMP

FIELD OF THE UTILITY

The present utility relates to a cartoon drawer, more particularly, to a cartoon drawer with built-in lamp to save the effort of buying a lamp to fit the drawing table, thus saving cost and achieving convenience.

BACKGROUND OF THE UTILITY

The playback of an animated cartoon is performed by displaying continuously a series of picture frame thereof with an interval short enough to cause the visual attention of viewers. Because there is only a slight difference between consecutive picture frames, i.e., the still background is almost the same and the animated portion has only slight differences, the production of an animated cartoon can utilize this property to save production effort. After finishing the first picture frame, the second picture frame can be produced with relative ease by overlapping a tracing paper upon the first picture frame that is already finished and drawing only the distinction portion. The subsequent picture frames can be produced in a similar way.

A cartoon drawer is intended to facilitate the above procedures such as overlapping of tracing papers and shifting an upper an tracing paper to the desired position for painting.

The conventional cartoon drawing apparatus generally comprises a drawer, a drawing table and a lighting lamp. As shown in FIG. 1, the drawer of the conventional cartoon drawing apparatus generally comprises a casement (1), a ground glass (2) and upper/lower positioning rulers (3), wherein the casement (1) is disk-shaped and has a hollow central portion for accommodating the ground glass (2). Moreover, a pair of grooves (11) parallel to each other are formed on the casement (1) and located adjacent to the top and bottom side of the ground glass (2), respectively. The rulers and (3) are strip-shaped and can move within the grooves (11) in a lateral direction.

As shown in FIG. 2, the drawer with the casement (1), the ground glass (2) and the upper/lower positioning rulers (3) has the following arrangement. The casement (1) is placed within an aperture (41) formed on the top surface of the drawing table (4). A lighting lamp (5) is placed within the aperture (41). The tracing paper is illuminated by the light emitted from the lamp (5) through aperture (41) and the ground glass (2). Meanwhile, the tracing paper to be painted is placed upon the tracing paper already finished and the image of underlying paper can emerge by exposure to the light of the lamp (5). The cartoon creator can conveniently draw the upper paper by reference to the image of the underlying paper.

However, there are some drawbacks in a conventional cartoon drawing apparatus in that the manufacture of the drawer, the drawing, table and the lamp involves different levels of skill. The cartoon creators often need to buy the three components separately and set up by themselves. And worse, sometimes the lamp should be tailored to meet a special requirement. Although there are commercially-available drawing, apparatus which contain all the components, those components are manufactured separately and the cost is accordingly high. Moreover, the design of the drawer makes it difficult to use with another table.

It is the object of the present invention to provide a cartoon drawer with built-in lamp to overcome above drawbacks and save cost. The cartoon drawer with built-in lamp according to the present invention comprises a disk, a tank formed in the central portion of the disk, a ground glass plate placed upon the tank and covering the tank to allow the light of lamp within the tank to transmit therethrough, a pair of positioning rulers placed on the top/bottom sides of tank respectively, and a pair of the fixing plates placed on the outer side of the ruler respectively to guide the ruler laterally. By using, this arrangement, the cartoon drawer has a built-in lamp and the user only needs to place the cartoon drawer with built-in lamp within the aperture of the cartoon-drawing, table without the problem of buying and setting-up a lamp. Moreover, the user can utilize a common drawing table by forming an aperture of suitable size on the top surface of the common drawing table, thus saving cost.

BRIEF DESCRIPTION OF THE DRAWINGS

In order to better understand the present invention, reference should be made to the following detailed description taken in junction with the accompanying drawings wherein.

DETAILED DESCRIPTION OF THE PREFERRED EMBODIMENT

Figure 1:
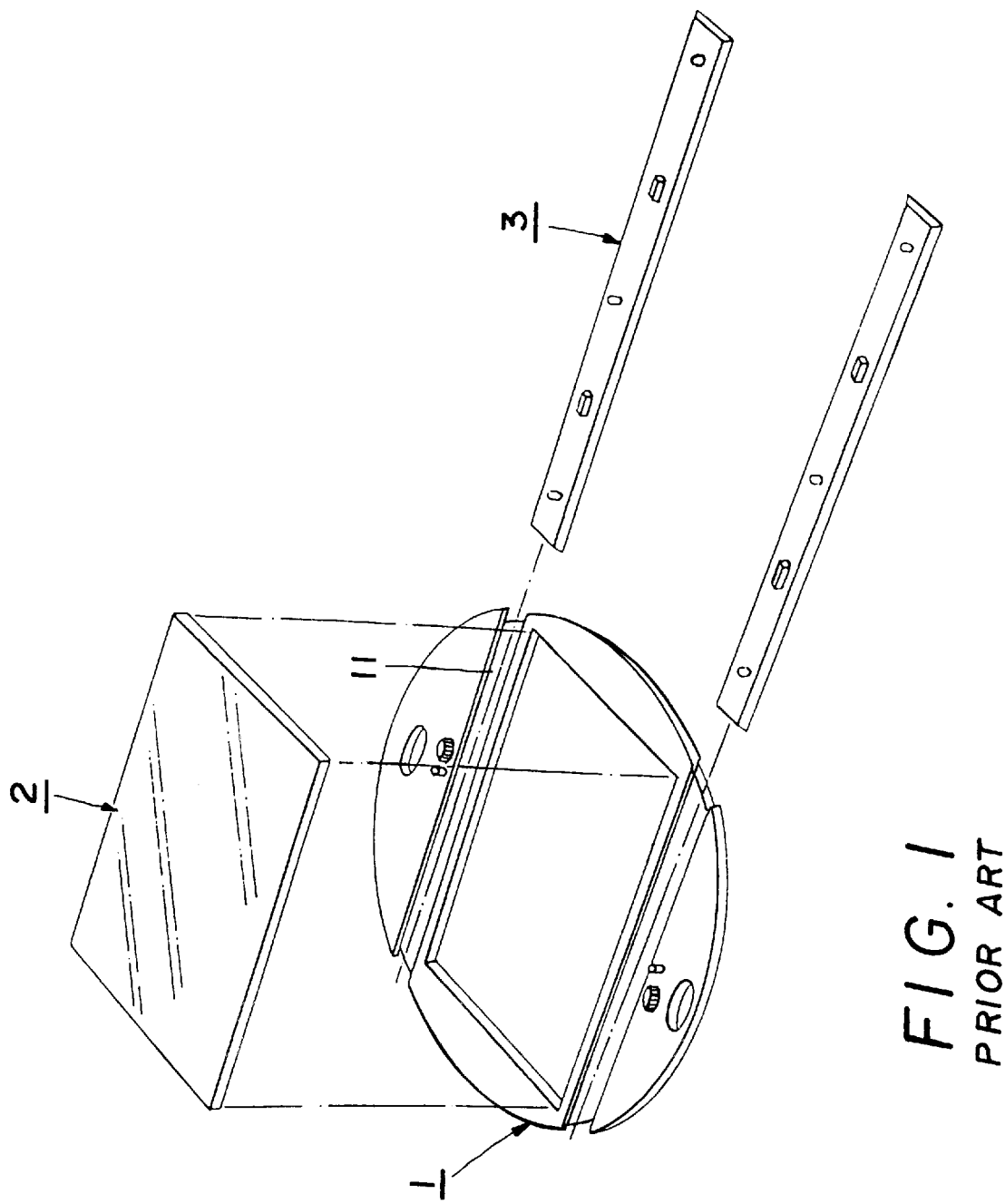
FIG. 1 shows the conventional cartoon drawer apparatus.
Figure 2:
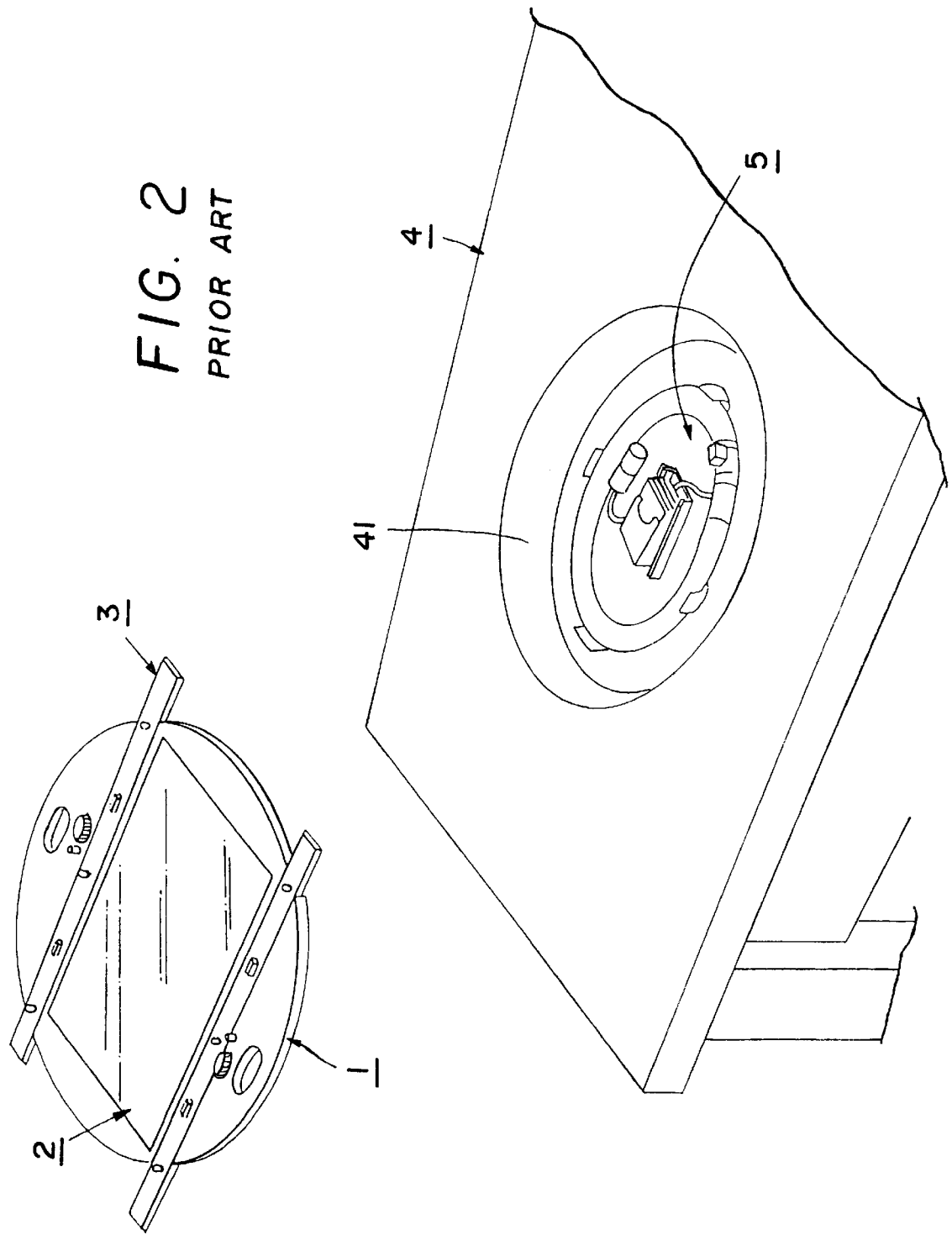
FIG. 2 shows the arrangement and operation of the drawer, table and lamp in the conventional cartoon drawing apparatus.
Figure 3:
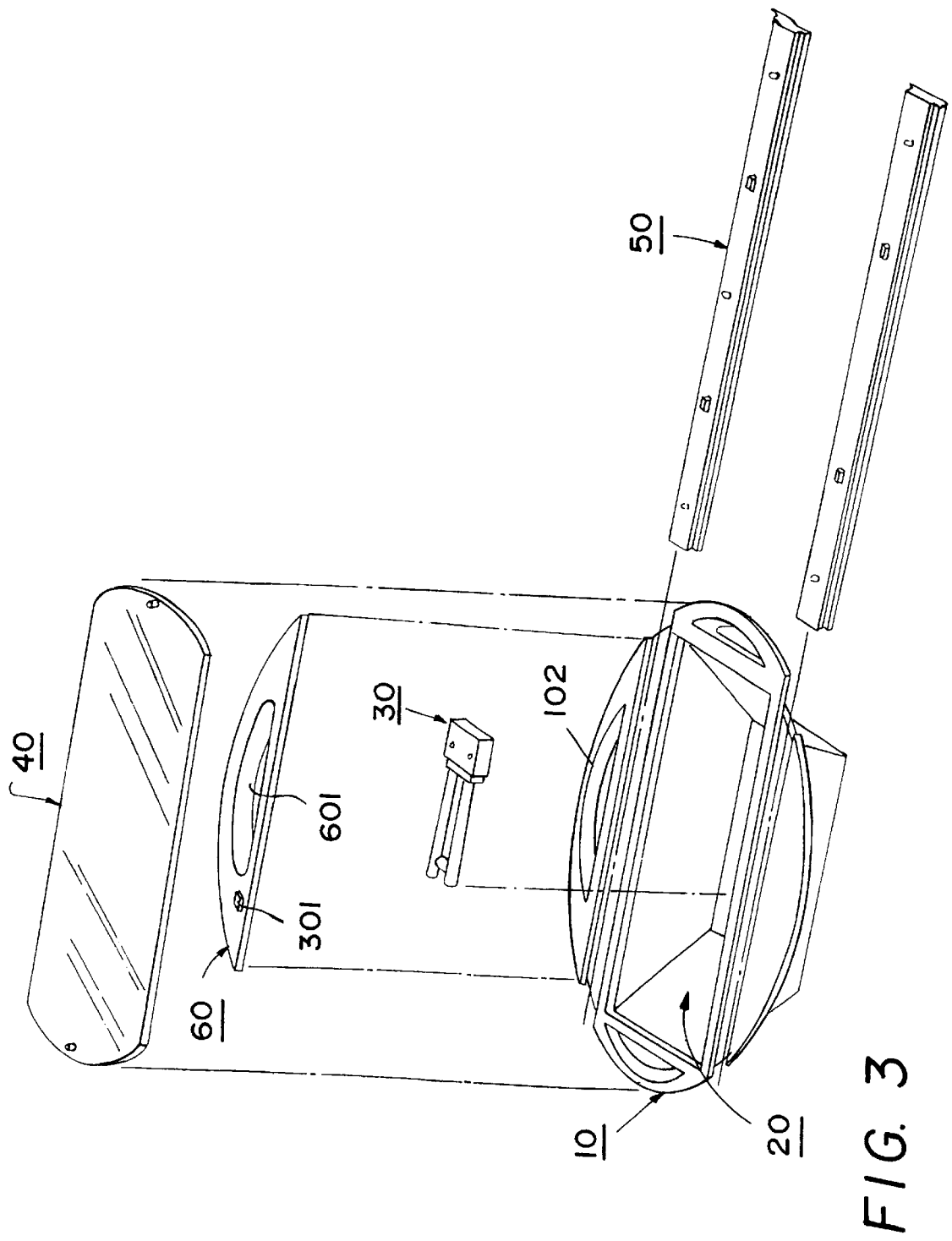
FIG. 3 is an exploded view of the present invention.
Figure 4:
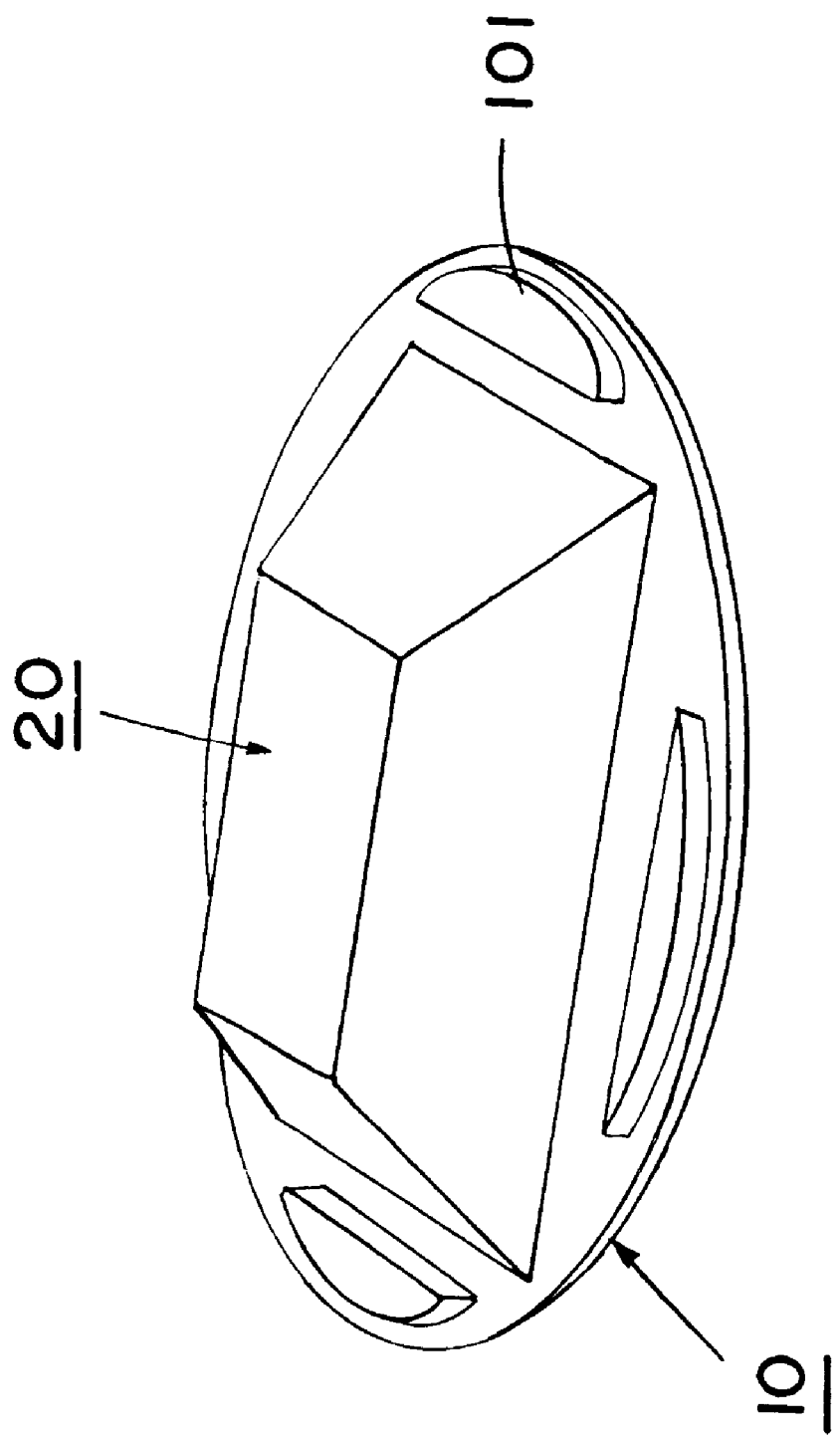
FIG. 4 is the bottom view of the present invention.

As shown in FIGS. 3 and 4, the cartoon drawer according to the present utility comprises a disk (10), a tank (20) formed in the central portion of the disk (10), a ground glass plate (40) placed upon the tank (20) and covering the tank (20) to allow the light of a lamp within the tank (20) to transmit therethrough, a pair of positioning rulers (50) placed on the top/bottom sides of tank (20) respectively, and a pair of fixing plates (60) placed on the outer side of each ruler (50) respectively to guide each ruler (50) for sliding laterally.

Figure 5:
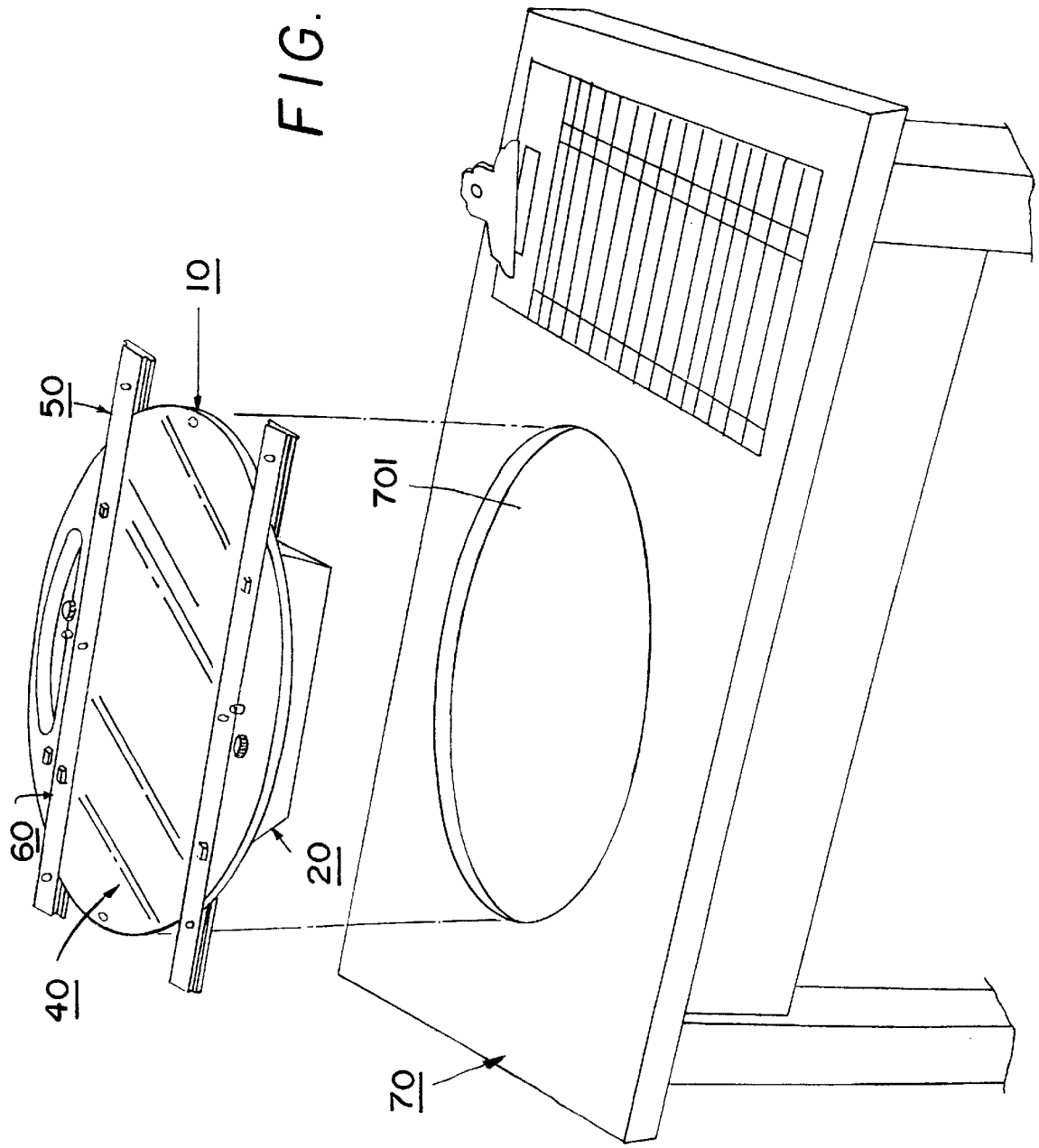
FIG. 5 shows the operation of the present invention.
Figure 6:
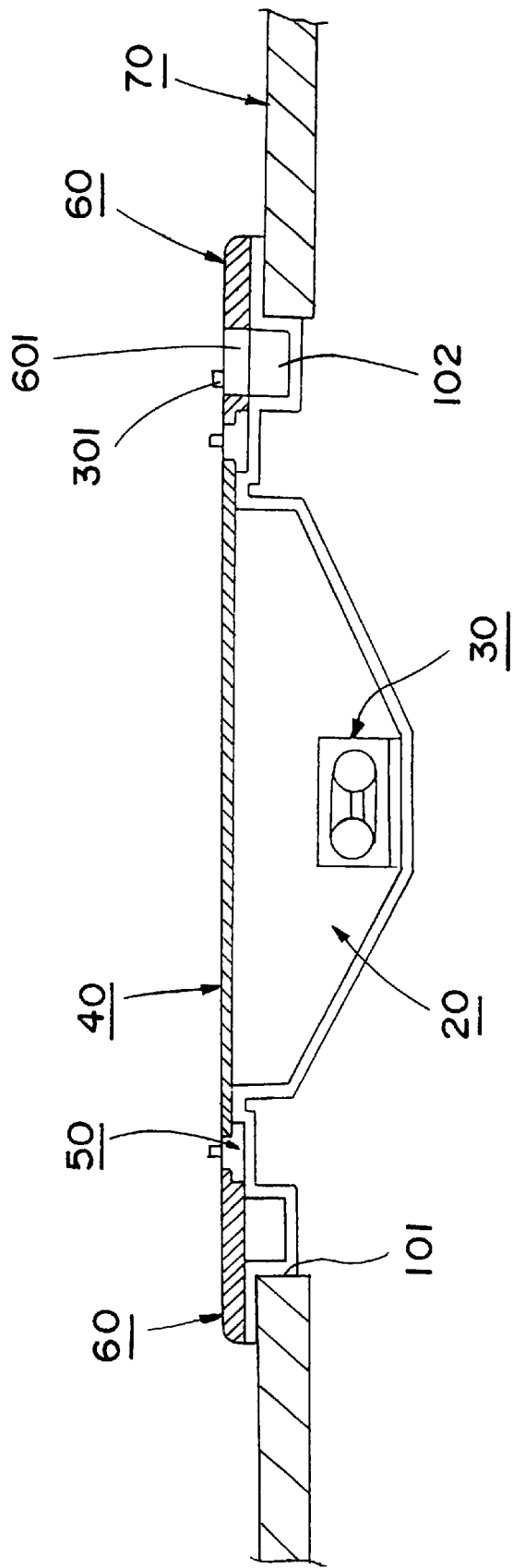
FIG. 6 is the side view of the present invention.

The outer diameter of the disk (10) is slightly larger than the diameter of the aperture (701) of the drawing table (70) as shown in FIG. 5 such that the tank (20) can be embedded within the aperture (701) and the bottom of the peripheral of the disk (10) lie against the peripheral surface around the aperture (701) as the disk (10) is placed in the aperture (701).

Moreover, a plurality of clamping borders (101) can be formed on the bottom side of the disk (10) and the outer surfaces thereof contact the inner surface of the aperture (701) as the disk (10) is placed in the aperture (701) such that the disk (10) is rotatable but not slidable within the aperture (701), as shown in FIG. 4.

Furthermore, as shown in FIG. 3, a recess (102) can be formed in the top end of the disk (10) and a hole (601) corresponding to the slot is formed in the fixing plate (60) on the top end of the disk (10), therefore tools such as pencils and eraser . . . etc., can be placed within the recess (102) through the hole (601). Besides, the recess (102) can be placed at any position on the top surface of the disk (10) and there is no limit on its number. Moreover, the tank (20) and the recess (102) can be formed integrally with the disk (10).

Besides, the lamp (30) within the tank (20) can adopt a compact PL lamp to reduce weight and space and the power switch (301) of the lamp (30) is arranged upon the top surface of the disk (10).

By using the above arrangement, the cartoon drawer has a built-in lamp and the user only need to place the cartoon drawer with built-in lamp within the aperture of the cartoon-drawing table (70) without the problem of buying and setting-up a lamp. Moreover, the user can utilize a common drawing table by forming an aperture of suitable size on the top surface of the common drawing table, thus saving cost. Furthermore, the recess (102) and hole (601) arranged on the top surface of the disk (10) can accommodate a pencil, eraser, . . . etc., which is convenient for the user.

While this invention has been described in connection with what is presently considered to be the most practical and preferred embodiment, it is to be understood that the invention is not limited to the disclosed embodiment and has various modifications. Therefore, the present invention is intended to cover various modifications and equivalent arrangements included within the spirit and scope of the appended claims.

I claim:

1. A cartoon drawer for use in conjunction with a drawing table having an aperture formed therein, which drawer comprises:

(a) a disk including a tank formed in a central portion thereof and a peripheral portion surrounding the tank, the peripheral portion including a top side and a bottom side, the tank for insertion within an aperture of a drawing table and the peripheral portion having a diameter exceeding the diameter of the aperture for supporting the disk on the table;

(b) a lamp disposed within the tank;

(c) a glass plate covering the tank for transmitting light from the lamp therethrough;

(d) a pair of fixing plates disposed on the top side of the peripheral portion on opposite sides of the glass plate;

(e) a positioning ruler disposed between each fixing plate and the glass plate for guided sliding movement therebetween; and (f) a plurality of clamping borders extending downwardly from the bottom side of the peripheral portion for engaging an inner surface of the aperture and restricting the disk to only rotational movement within the aperture.

2. The cartoon drawer of claim 1, further including a hole formed in at least one of the fixing plates and a corresponding recess formed in the top side of the peripheral portion for receiving and storing articles therein.

3. The cartoon drawer of claim 1, wherein the tank and peripheral portion are integrally formed.

* * * * *